Patented Feb. 5, 1952

2,584,774

UNITED STATES PATENT OFFICE 2,584,774

SILVER SOLDER ALLOY

Russell J. Smith, Houghton, and Raymond J. Marcotte, Lake Linden, Mich., assignors to Square D Company, Detroit, Mich., a corporation of Michigan No Drawing. Application January 27, 1949, Serial No. 73,216

2 Claims. (Cl. 75—134)

This invention relates to a metallic alloy having improved soldering characteristics and of the type commonly known as "silver solder."

An object of the invention is an improved silver solder having a lower melting point than known silver solders of comparable soldering characteristics.

Another object of the invention is the provision of a silver solder having superior wetting properties.

A further object of the invention is a silver solder having a relatively low melting point and superior wetting properties, particularly with respect to the soldering of silver, copper and brass materials.

Other objects and features of the invention will be readily apparent to those skilled in the art from the following description:

The silver alloy solder according to the present invention is formed of an alloy of silver, copper, tin, cadmium and zinc within the following composition range:

| | Per cent |
|---|---|
| Silver | 40 to 45 |
| Copper | 20 to 24 |
| Tin | 13 to 18 |
| Cadmium | 13 to 17 |
| Zinc | 5 to 8 | and with one of the preferred exact compositions substantially as follows:

| | Per cent |
|---|---|
| Silver | 41.3 |
| Copper | 21.7 |
| Tin | 16.2 |
| Cadmium | 15.5 |
| Zinc | 5.3 |

The silver alloy of the above composition melts very quickly and at an almost constant temperature rather than over a wide range of temperatures. The alloy is very nearly of a eutectic composition. The melting point is approximately 1040° F.

The alloy is preferably made by melting the copper and silver together and then adding the tin, zinc and cadmium in that order and while the alloy is cooling. The alloy is then shotted by pouring it into mater, which breaks it up into relatively small particles which are then dried and subsequently crushed and/or ground to size in conventional crushing and grinding equipment.

The solder, as produced, is relatively brittle so that it cannot be rolled into sheets or drawn into rods. It can be used either in powdered form as produced above, or it may be cast into rods.

Although the solder as produced may be brittle, it nevertheless produces a strong and tough joint between the materials to be soldered or brazed. This is probably the result of the superior wetting properties of the solder alloy which provides a very thin layer of the solder in intimate contact with the materials to be joined together. An example only of but one of the unlimited uses of this solder has been the soldering of silver base electrical contacts to copper and brass contact fingers. The joint produced was stronger than the contact used, so that the contact material ruptured before the joint would separate.

Where the solder is used to join a silver base material to either copper or brass, it is possible that the resulting strong and tough joint may result not only from the thin layer of solder produced from the superior wetting qualities, but also from the solution of the joined materials into the thin solder layer.

While a preferred embodiment of the invention has been specifically described, it is to be understood that the invention is not limited thereto as many variations will be readily apparent to those skilled in the art, and the invention is to be given its broadest interpretation within the scope of the following claims.

What is claimed is:

1. An alloy consisting essentially of silver 40% to 45%, copper 20% to 24%, tin 13% to 18%, cadmium 13% to 17% and zinc 5% to 8%.

2. An alloy comprised substantially of silver 41.3%, copper 21.7%, tin 16.2%, cadmium 15.5% and zinc 5.3%.

RUSSELL J. SMITH.
RAYMOND J. MARCOTTE.

REFERENCES CITED

The following references are of record in the file of this patent:

UNITED STATES PATENTS

| Number | Name | Date |
|---|---|---|
| 1,455,531 | Hyman | May 15, 1923 |
| 1,612,782 | Vogt et al. | Dec. 28, 1926 |
| 2,041,381 | Streicher | May 19, 1936 |
| 2,071,211 | McKinney | Feb. 16, 1937 |
| 2,189,640 | Powell | Feb. 6, 1940 |
| 2,235,634 | Hensel et al. | Mar. 18, 1941 |
| 2,310,231 | Goldsmith | Feb. 9, 1943 |
| 2,362,893 | Durst | Nov. 14, 1944 |
| 2,456,594 | Polak | Dec. 14, 1948 |

OTHER REFERENCES

Vickers: "Metals and Their Alloys," 1923, pages 192, 210, and 560, published by Henry Carey Baird & Co., New York.